United States Patent [19]

Hallworth

[11] Patent Number: 4,978,402
[45] Date of Patent: * Dec. 18, 1990

[54] FORMATION OF FLEXIBLE LAMINATES BY BONDING A BACKING TO A PRE-COATED SUBSTRATE

[75] Inventor: Gerald Hallworth, Ramsbottom, England

[73] Assignee: The Dow Chemical Company, Midland, Mich.

[ * ] Notice: The portion of the term of this patent subsequent to Jun. 21, 2005 has been disclaimed.

[21] Appl. No.: 267,381

[22] Filed: Nov. 4, 1988

Related U.S. Application Data

[63] Continuation-in-part of Ser. No. 128,080, Dec. 3, 1987, which is a continuation of Ser. No. 828,528, Feb. 12, 1986, Pat. No. 4,752,510.

[30] Foreign Application Priority Data

Nov. 6, 1987 [GB] United Kingdom ................ 8726104

[51] Int. Cl.$^5$ ............................................. B32B 31/12
[52] U.S. Cl. ...................................... 156/77; 118/406; 118/407; 118/414; 156/78; 156/283; 156/291; 427/288
[58] Field of Search ................... 156/77, 78, 283, 291; 118/406, 407, 414; 427/256, 288

[56] References Cited

U.S. PATENT DOCUMENTS

| | | | |
|---|---|---|---|
| 2,352,463 | 6/1944 | Wenzelberger et al. | 524/55 |
| 2,517,737 | 8/1950 | Travis | 524/55 |
| 2,909,278 | 10/1959 | Blackford | 524/493 |
| 3,904,566 | 9/1975 | Cudby | 524/437 |
| 3,919,973 | 11/1975 | Zimmer | 118/406 |
| 3,925,271 | 12/1975 | Balinth | 524/492 |
| 3,933,579 | 1/1976 | Kershaw et al. | 521/64 |
| 4,016,831 | 4/1977 | James et al. | 118/415 |
| 4,077,809 | 3/1978 | Plunguian et al. | 524/8 |
| 4,094,241 | 6/1978 | Kossler | 118/414 X |
| 4,094,685 | 6/1978 | Lester et al. | 521/76 |
| 4,157,322 | 6/1979 | Colegrove | 523/129 |
| 4,179,298 | 12/1979 | Nelson et al. | 521/77 |
| 4,232,136 | 11/1980 | Kovacsay et al. | 521/65 |
| 4,239,821 | 12/1980 | McLean et al. | 118/415 X |
| 4,350,785 | 9/1982 | Habib | 524/55 |
| 4,356,819 | 11/1982 | Potaczek | 524/55 |
| 4,357,373 | 11/1982 | Cooper | 118/414 |
| 4,476,276 | 10/1984 | Gasper | 524/493 |
| 4,505,976 | 3/1985 | Doehnert et al. | 524/55 |
| 4,537,915 | 8/1985 | Oberle et al. | 521/70 |
| 4,585,826 | 4/1986 | Graves | 524/493 |
| 4,626,567 | 12/1986 | Chang | 524/493 |
| 4,647,618 | 3/1987 | Bauman et al. | 521/65 |
| 4,722,954 | 2/1988 | Hallworth | 524/55 |
| 4,752,510 | 6/1988 | Hallworth | 427/256 |
| 4,781,781 | 11/1988 | Hallworth | 156/328 |

FOREIGN PATENT DOCUMENTS

| | | | |
|---|---|---|---|
| 520794 | 1/1956 | Canada | 524/493 |
| 800051 | 11/1968 | Canada | 524/493 |
| 1240652 | 5/1967 | Fed. Rep. of Germany | 524/493 |
| 2357833 | 11/1974 | Fed. Rep. of Germany | 118/406 |
| 3021693 | 12/1981 | Fed. Rep. of Germany | 524/23 |
| 78074 | 6/1980 | Japan | 524/493 |
| 11863 | 1/1982 | Japan | 524/5 |
| 92557 | 6/1982 | Japan | 524/5 |
| 2375 | 1/1983 | Japan | 524/493 |
| 202279 | 11/1984 | Japan | 524/5 |
| 1220387 | 1/1971 | United Kingdom . | |
| 2069477 | 8/1981 | United Kingdom | 524/5 |
| 1604215 | 12/1981 | United Kingdom . | |
| 2172851 | 10/1986 | United Kingdom . | |

Primary Examiner—Robert A. Dawson
Attorney, Agent, or Firm—Fisher, Christen & Sabol

[57] ABSTRACT

A flexible laminate, such as backed tufted carpeting, is formed by bonding a fabric or polymeric backing layer to a pre-coated textile substrate. The substrate is pre-coated by advancing it past a perforated hollow transfer roller (3) containing an internal doctor member (4). Fluent settable coating material is fed to the substrate (1) so that it forms a well (6) between the substrate (1) and the doctor member (4) through the perforations of the roller (3). Coating material is deposited on the fabric (1) and is then set, for example by passing through an oven, to form the pre-coat. The spacing of the roller (3) and the substrate (1) and the pressure of the doctor member (4) on the perforated wall of the roller (3) are adjusted so that a pre-coat of desired thickness or density is obtained.

15 Claims, 2 Drawing Sheets

FORMATION OF FLEXIBLE LAMINATES BY BONDING A BACKING TO A PRE-COATED SUBSTRATE

This is a continuation-in-part application of application Ser. No. 128,080, filed Dec. 3, 1987, which is a continuation of application Ser. No. 828,528, filed Feb. 12, 1986, now U.S. Pat. No. 4,752,510.

This invention relates to a method for forming a flexible laminate by bonding a backing layer to a pre-coated textile substrate.

In the manufacture of carpeting comprising a tufted fabric layer having a back surface to which is bonded a backing material such as a reinforcing fabric or a foam polymeric layer it is customary to apply a pre-coat to such surface prior to attachment of the backing material such as a reinforcing fabric or a foam polymeric layer it is customary to apply a pre-coat to such surface prior to attachment of the backing material. The pre-coat may be a latex foam which is applied to the substrate surface with a doctor member such that the foam collapses and is pressed onto the substrate to form a thin coating. This coating acts to hold the tufts of the fabric layer in position and provides a coherent surface to which the backing material can be more readily bonded. A solid roller is normally used as the doctor member and the pressure or spacing between this and the substrate is adjusted to give a desired thickness for the pre-coat.

GB No. 2172851A describes apparatus (hereinafter referred to as apparatus of the kind defined) for applying a coating material to a surface which comprises a transfer member in the form of a roller having a perforated outer wall, a guide arrangement for moving a surface to be coated in contact with or in close proximity to the roller, a feed arrangement for feeding fluent coating material to the perforated roller to be deposited therefrom onto the surface and an abutment for the coating material within the perforated roller, the feed arrangement being arranged to supply said fluent coating material to the outside of said perforated outer wall so that it forms a well of such material between the said surface and the said abutment through the perforated wall.

GB No. 2172851A describes the use of apparatus of the kind defined for forming a coating layer having a desired flat or embossed pattorned surface on an uneven surface such as the back surface of a tufted fabric layer of carpeting.

In accordance with the present invention it has been found that apparatus of the kind defined can be used to advantage in the application of a pre-coat to a substrate.

According to one aspect of the invention therefore there is provided a method of forming a flexible laminate by bonding a backing layer to a pre-coated textile substrate, said method comprising the steps of:

moving the substrate with a guide arrangement relative to a rotatable transfer roller so that a back surface of the substrate is in contact with or in close proximity to the roller;

feeding fluent settable coating material to the roller to be deposited therefrom onto the said back surface of the substrate;

causing or allowing the deposited coating material to set so as to form a pre-coat on said back surface; and bonding a backing layer to said pre-coated back surface;

characterised in that said transfer roller is a hollow perforated roller containing an internal doctor member; the fluent coating material is fed to the roller so as to form a well of the material between and freely in contact with the back surface and the doctor member through the perforated wall of the roller; and the spacing of the roller relative to the substrate and the pressure of the doctor member relative to the perforated wall of the roller are adjusted to give a desired thickness or density of the pre-coat.

With this method a pre-coat of desired thickness or density (i.e. penetration density of the surface) can be more readily achieved due to the enhanced adjustability compared with a conventional solid doctor roller.

When applying a coating to an uneven fibrous surface, such as the back surface of tufted carpeting, it is difficult to ensure adequate penetration of the depressions and inter-fibre interstices of the surface without forming a coating layer which is unduly thick especially in the vicinity of raised regions of the surface. With the present invention this problem can be overcome due to the use of the well of material which freely contacts both the substrate surface and the perforated roller. Thus, depressions and inter-fibre interstices can be readily filled with the coating material because the material can flow freely from the well into the depressions and interstices, and excess material can be transferred back through the perforated roller wall into the interior of the roller thereby to avoid an undue accumulation especially at raised parts of the surface. Moreover, due to the use of the adjustable perforated roller and the adjustable doctor member better control of the applied coating is possible. Thus, with the prior art solid roller, an increase in pressure which forces more material into the substrate surface is necessarily accompanied by a predetermined degree of reduction of the roller/substrate gap and a corresponding compaction of the applied material. With the present invention the pressure can be varied without necessarily correspondingly changing the roller/substrate gap (and conversely the roller/substrate gap can be varied without necessarily correspondingly changing the pressure) whereby a desired thickness and density of the applied material can be more readily attained.

Preferably, the transfer roller is arranged above a support of said guide arrangement which supports said substrate, and the spacing of said roller and said support is adjustable to adjust the said spacing of the roller relative to the substrate.

Preferably also, the doctor member comprises a resiliently deflectable blade which is non-rotatably mounted within the transfer roller so as to make sliding contact with its inner surface, and the blade is movable in a direction towards and away from the inner surface of the roller to adjust the deflection of the blade and hence the said pressure of the doctor member relative to the perforated wall of the roller. However, other kinds of doctor members such as a solid roller or an inner perforated roller or the like may be possible, and the doctor member may be movable (e.g. a rotatable roller).

Further, the coating material may be fed to the said back surface of the substrate externally of, close to and upstream of the transfer roller so as to form a continuous elongate body of the material extending across the substrate and longitudinally of the roller continuously in direct contact with both the outer surface of the roller and the back surface of the substrate along the length of such body.

The pre-coat may be formed from any suitable polymeric material, particularly although not necessarily a foamed material. In the case of a foamed material this may be fed to the perforated roller such that the expanded foam collapses at or in the vicinity of such roller and is crushed by the roller.

The polymeric material should be such as to withstand the shear forces imposed at the transfer roller. Also, it should have sufficient stability to avoid blockage of equipment used.

Suitably, an aqueous latex emulsion is used i.e. one or more polymers or copolymers capable of forming an emulsion or dispersion in water which is storage stable or at least which can be maintained as a stable homogeneous dispersion for an appreciable period of time sufficient for the purposes of utilisation thereof and which can be set or solidified particularly by drying or curing. The emulsion is preferably one which, in the final stage of polymerization is film forming at temperatures below 150° C., the film-forming properties being due to the properties of the polymer and possibly partly also to the presence of solvents or plasticizers. Suitable example emulsions are given in GB No. 1,105,538 and GB No. 2171411A and include polymer systems such as:

copolymers of butadiene and styrene in hot, cold and carboxylated form;

copolymers of butadiene and acrylonitrile in hot, cold and carboxlated form;

monopolymers of butadiene and styrene;

monopolymers of vinyl acetate;

mono- and copolymers of vinyl chloride;

mono- and copolymers of methyl, ethyl and butyl acrylate;

copolymers of ethylene and vinyl acetate;

copolymers of ethylene, vinyl acetate and vinyl chloride;

monopolymers of chloroprene.

It is not essential to use a latex and thus for example it is possible to use a plastisol such as mono- and copolymers of vinyl chloride in plastisol form. Also starch and starch blends can be used.

The polymeric material may contain other substances for example comprising any one or more of:

a filler such as limestone, calcium carbonate, dolomite, barytes in an amount of say 0 to 1600 parts per 100 parts of polymeric system;

a soap or surfactant foaming agent such as sodium lauryl sulphate;

a thickener/emulsion stabilising agent such as polyhydroxy ethyl cellulose, sodium polyacrylate;

a sequestering agent such as sodium hexametaphosphate;

a foam stabilising agent such as disodium N-stearyl sulphosuccinamate;

an antioxidant such as an alkylated phenol.

The polymeric material may be set by passing through an oven. Setting may be effected simply by drying. Alternatively setting may involve curing or vulcanising and in this case suitable cross-linking agents (such as sulphur), accelerators, activators and the like may be incorporated as appropriate.

The solids content of the polymeric material may be in the range 25% to 85%, the density say 50 g/liter (unfilled) to 2600 g/liter (e.g. filled with barytes high solids content). The viscosity may be 200 cps to 60,000 cps or higher, prior to any foaming. Foaming may be effected mechanically e.g. by injection of compressed air. In general density and viscosity would be related so that, for example, the material has a low density at low viscosity and a high density at high viscosity.

Preferably the substrate to which the pre-coat is applied comprises a tufted fabric carpeting layer, i.e. a woven or other textile backing cloth having cut or uncut loops pushed therethrough.

With regard to the said backing layer bonded to the pre-coated substrate, this may comprise a layer of polymeric material (foamed or unfoamed) or a sheet e.g. of fabric material bonded to the pre-coat in any suitable manner. Thus in the case of carpeting, a backing fabric such as a jute or polypropylene backing fabric, or a foamed or unfoamed latex layer may be bonded to the pre-coat. Such latex layer may be a natural or synthetic rubber layer or may be any other suitable layer and may be formed from a material as described above in relation to the pre-coat or from any other material as described in GB No. 1,105,538 or GB No. 2171411A and may be applied as described in GB No. 2172851A or GB No. 2171411A. Thus, in one embodiment, the layer of polymeric material is formed in situ by the steps of:

moving the pre-coated substrate with a guide arrangement relative to a rotatable application roller so that the pre-coated back surface of the substrate is in contact with or in close proximity to the roller;

feeding fluent settable polymeric material to the application roller to be deposited therefrom onto the said pre-coated back surface of the substrate; and causing or allowing the deposited polymeric material to set so as to form a polymeric backing layer on said pre-coated back surface. Preferably, the application roller is a hollow perforated roller containing an internal abutment; and the fluent polymeric material is fed to the roller so as to form a well of the material between and freely in contact with the back surface and the abutment through the perforated wall of the application roller.

According to a second aspect of the present invention there is provided apparatus for use in forming a flexible laminate by bonding a backing layer to a pre-coated textile substrate, said apparatus having a first station comprising a transfer roller, a guide arrangement for moving the textile substrate in contact with or in close proximity to the roller, a feed arrangement for feeding fluent settable pre-coating material to the roller to be deposited therefrom onto the substrate, means for causing or allowing the deposited pre-coating material to set; and said apparatus further having a second station comprising means for bonding a backing layer to said pre-coated back surface; characterised in that said transfer roller is a hollow roller having a perforated outer wall containing an internal doctor member; said feed arrangement is operable to feed said pre-coating material to the outside of said perforated outer wall so as to form a well of such material between and freely in contact with the substrate and the doctor member through the perforated wall; means is provided for adjusting the spacing of the roller relative to the substrate; and means is provided for adjusting the pressure of the doctor member against the inner surface of the perforated wall of the roller.

Preferably, the guide arrangement comprises a support roller, the transfer roller is arranged above to define an elongate nip with the support roller, said nip being bounded at the top thereof directly by the perforated wall of the transfer roller continuously along the length of the nip.

Preferably also, said bonding means of said second station comprises an application roller, a guide arrangement for moving the pre-coated textile substrate in contact with or in close proximity to the application roller, a feed arrangement for feeding fluent settable polymeric material to the roller to be deposited therefrom onto the substrate; and wherein said application roller is a hollow roller having a perforated outer wall containing an internal abutment and said feed arrangement is operable to feed said polymeric material to the outside of said perforated outer wall so as to form a well of such material between and freely in contact with the substrate and the abutment through the perforated wall.

The said second station may be distinct from the first station. Alternatively, it is possible to use the same station for both pre-coating and application of the backing layer of polymeric material. With this arrangement, the pre-coated material is removed from the first station and is then fed back through the first station after appropriately changing the coating material and after changing settings and substituting a different abutment for the internal doctor member as necessary.

The invention will now be described further by way of example only and with reference to the accompanying drawings in which.

Figure 1:
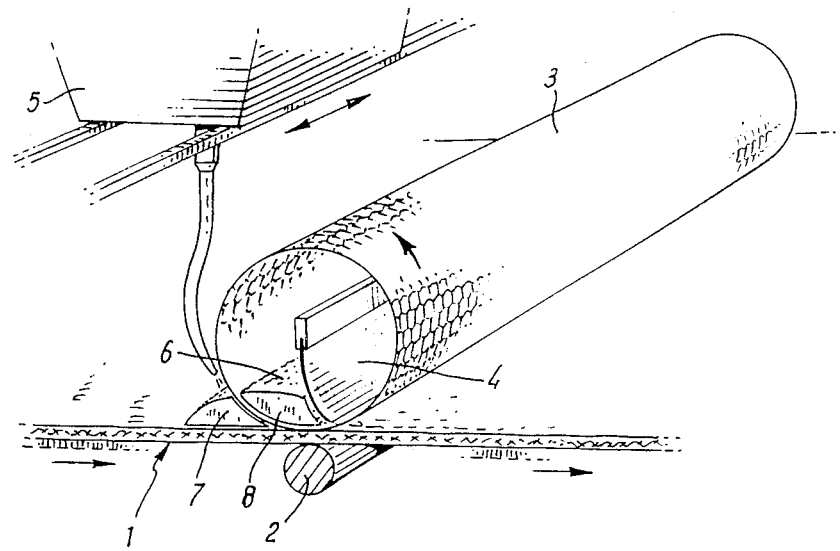
FIG. 1 is a diagrammatic perspective view illustrating application of a pre-coat to a substrate in accordance with the method of the present invention.
Figure 2:
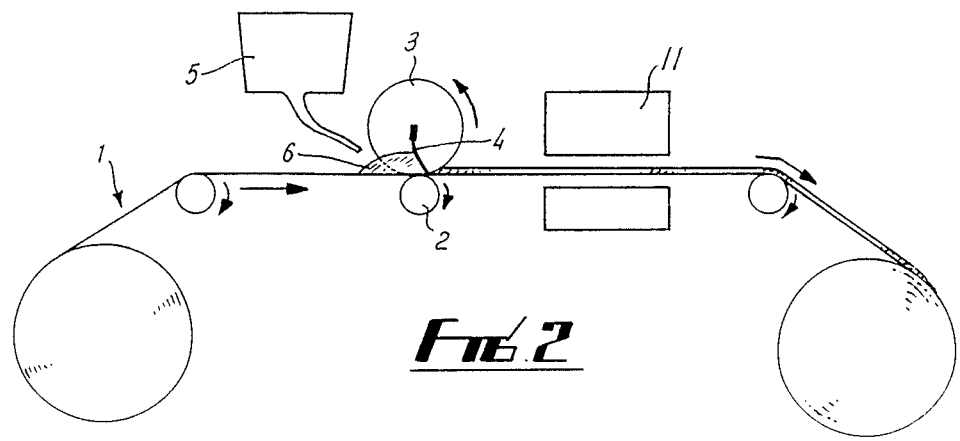
FIG. 2 is a diagram showing the pre-coating stages of the method of the invention.

Tufted carpeting fabric is fed from a supply roll through a pre-coating station at which a thin coating of latex material is applied to the back surface of the fabric 1. The fabric comprises a woven scrim or backing cloth with cut or uncut loops pushed through.

At the station the fabric 1 passes through a nip defined between a rotatable bottom support roller 2 and a rotatable top perforated roller 3 with the back surface of the fabric facing the roller 3. The roller 3 has regular perforations over its entire surface. Within the roller 3 there is a doctor blade or squeegee 4 comprising a flexible, springy stainless steel blade of elongate form positioned above the lowermost part of the inner surface of the roller 3 and extending along substantially the entire length of the roller 3. The blade 4 makes sliding contact with the inner surface of the roller 3. Fluent foamed latex material is fed from a supply reservoir 5 between the fabric 1 and the roller 3 via an outlet which is moved backwards and forwards across the fabric 1 so that a well 6 is formed in the wedge-shaped gap between the fabric 1 and the blade 4 through the perforation of the roller 3. The well 6 is retained axially by end plates 7, 8 (internally and externally of the roller). There is no flow-restricting structure between the fabric and the roller 3 so the well is freely in contact continuously with both.

Figure 3:
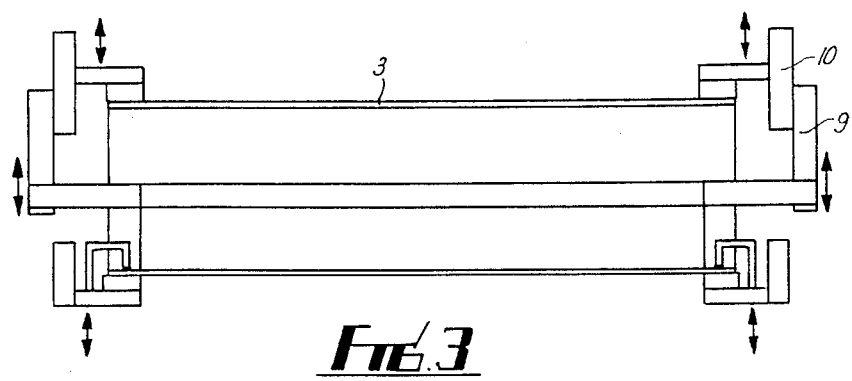
FIG. 3 is a longitudinal diagrammatic sectional view of a transfer roller of the pre-coating apparatus.
Figure 4:
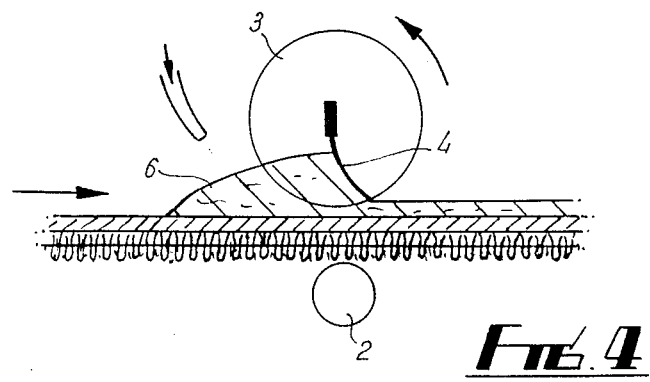
FIG. 4 is a transverse diagrammatic sectional view of the roller of FIG. 3.

The perforated roller 3 and the blade 4 are movably mounted in end frames 9, 10 (FIG. 3) so that the vertical spacing or pressure between the roller 3 and the fabric 1 and between the blade 4 and the inside of the perforated roller 3 can be respectively, independently, adjusted. That is, the vertical position of the roller 3 can be adjusted to adjust the spacing at the nip between the rollers 2, 3 thereby to adjust the gap between the fabric back surface and the roller 3 or, if the roller is contacting the back surface, to adjust the amount by which the fibres of the back surface are compressed. The vertical position of the doctor blade 4 is adjusted to adjust the degree of bending of the blade between one extreme at which the blade just rests on the roller inner surface and the opposite extreme at which the blade is substantially bent over and presses very firmly against the roller surface. Adjustment of the roller 3 and blade 4 may be effected by linkages, screw devices, hydraulic or pneumatic devices etc. The roller 3 and the blade 4 may have resilient mountings, or the adjustment devices may be resilient.

The latex foam collapses as it is pressed by the perforated roller/doctor blade system onto the fabric back surface and a thin coherent coating layer is formed the thickness and density of which are determined by the adjusted spacing/pressure of the roller 3 and blade 4. The coating layer is then caused or allowed to set e.g. by passing the coated fabric through an oven 11. The pre-coated surface of the fabric can then be coated with a foam backing layer by passing the fabric through a treatment station may be similar to the pre-coating station described above. Indeed, it may be possible to use the same station for application of the pre-coating layer and for subsequent application of the foam backing with appropriate changes in the material fed to the coating station and to the adjustment of the roller 3 and the blade 4. The blade 4 may also be replaced by a second inner fixed or rotatable roller as described in detail in GB 2172851A. Moreover, depending on the nature of the formulation and the curing technique for the backing material, instead of using only a drying oven, it may be necessary or desirable to use a heat-setting oven immediately after the application roller and before the drying oven.

In the following Examples different latex materials were used for the pre-coat, each such material comprising a mixture of the listed ingredients mechanically foamed by injection of compressed air. Percentages are by weight and proportions are in parts by weight.

EXAMPLE 1

A. Carboxylated styrene-butadiene rubber latex (60% styrene content);
B. 20% sodium hexametaphosphate (Calgon PT);
C. Water;
D. Ground limestone (Calmote AD);
E. Sodium laury sulphate soap (28% total solids content) Empicol L×28);
F. Sodium polyacrylate thickener (Texigel SPA 12).

The proportions are (in parts by weight)

|       | Wet    | Dry    |
|-------|--------|--------|
| A.    | 208.33 | 100.00 |
| B.    | 3.75   | 0.75   |
| C.    | 81.14  | —      |
| D.    | 600.00 | 600.00 |
| E.    | 1.78   | 0.50   |
| F.    | 5.00   | 0.75   |
| Total | 900.00 | 702.00 |

Total solids content - 78%
Ingredient (F) is added to give a viscosity of 5–6000 cps.

EXAMPLE 2

|  | Wet | Dry |
|---|---|---|
| (a) Dow Latex 816 | 200.00 | 100.00 |
| (b) Empicol Lx28 | 1.00 | 0.28 |
| (c) Texigel SPA12 | 2.72 | 0.41 |
|  | 203.72 | 100.69 |

TSC (Total solids content) 49.4%
Viscosity 1100 cps

EXAMPLE 3

| (a) Dow Latex ZD8418 | 200.00 | 100.00 |
|---|---|---|
| (d) 20% Calgon PT | 5.00 | 1.00 |
| (e) Dispex N40 | 0.50 | 0.20 |
| Water | 272.90 | — |
| (f) Calmote AD | 1500.00 | 1500.00 |
| (c) Texigel SPA12 | 2.84 | 0.43 |
| (b) Empicol Lx28 | 1.78 | 0.50 |
| (g) Empimin MKK | 1.43 | 0.50 |
|  | 1984.45 | 1602.63 |

TSC 80.7%
Viscosity 4000 cps

EXAMPLE 4

|  | Wet | Dry |
|---|---|---|
| (h) Vinamul 18092 | 167.00 | 100.00 |
| (i) 20% Ethylan R | 2.50 | 0.50 |
| Water | 68.00 | — |
| (d) 20% Calgon PT | 5.00 | 1.00 |
| (f) Calmote AD | 400.00 | 400.00 |
| (c) Texigel SPA12 | 41.70 | 6.26 |
|  | 684.20 | 507.76 |

TSC 74.2%
Viscosity 40,000 cps

EXAMPLE 5

| 60% High Ammonia Natural Latex | 167.00 | 100.00 |
|---|---|---|
| 20% Potassium Hydroxide | 5.00 | 1.00 |
| (b) Empicol Lx28 | 7.14 | 2.00 |
| (d) 20% Calgon PT | 5.00 | 1.00 |
| Water | 217.57 | — |
| (p) Calmote AD | 600.00 | 600.00 |
| (j) 50% Zinc Diethyl Dithiocarbamate | 2.00 | 1.00 |
| 50% Sulphur | 2.00 | 1.00 |
| (m) 40% Wingstay L | 2.00 | 1.00 |
| (c) Texigel SPA12 | 3.00 | 0.45 |
|  | 1010.71 | 707.45 |

TSC 70.00%
Viscosity 4000 cps

EXAMPLE 6

| (L) Vinamul 9300 | 167.00 | 100.00 |
|---|---|---|
| (M) Rcomol DBP | 3.00 | 3.00 |
| Water | 165.39 | — |
| (F) Calmote AD | 600.00 | 600.00 |
| (N) 2% Natrasol 250 HHR | 82.00 | 1.64 |
|  | 1017.39 | 704.64 |

TSC 69.2%
Viscosity 4500 cps (a) Trade mark Dow Chemicals for styrene butadiene copolymer
(b) Trade mark Albright & Wilson. Sodium lauryl sulphate
(c) Trade mark Scott Bader. Sodium polyacrylate
(d) Trade mark Albright & Wilson. Sodium hexametaphosphate
(e) Trade mark Allied Colloids. Polyacrylate dispersant
(f) Trade mark Tarmac. 200 mesh ground limestone
(g) Trade mark Albright & Wilson. Disodium N-stearyl sulpho succinamate
(h) Trade mark Vinamul Limited. Ethylene/vinyl acetate/vinyl chloride copolymer
(i) Trade mark Diamond Shamrock. Polyethylene oxide condensate
(j) e.g. Vulcafor ZDC - ICI Chemicals
(k) Trade mark Goodyear Chemicals - Antioxidant
(L) Trade mark Vinamul. Polyvinylacetate emulsion
(M) Trade mark Geigy Limited. Dibutyl phthalate
(N) Trade Mark Hercules. Polyhydroxy ethyl cellulose Tests were carried out with the material of Examples 2 and 3 to assess the strength of the resulting pre-coat. The results were as follows. The degree of fibre bond is approximate and represents the proportion of fibres in the tuft yarns which are penetrated and bonded together (by visual inspection). The tuft lock represents the force required to pull complete tufts away from backing cloth. The gap setting is the height of the roller surface above the support roller or support table beneath the carpeting. The doctor pressure setting is approximate and relates to the degree of flexing of the doctor blade (1 represents the tip of the blade just touching the roller, 10 represents the maximum practical bending of the blade).

Results using the material of Example 3 at a density of 700 g/liter on a carpet of overall thickness of 6 mm

| Cap Setting | Doctor Pressure Setting | Applied Weight gm/m$^2$ | Tuft Lock | Degree of fibre bond |
|---|---|---|---|---|
| 2 mm | 9 | 640 | 4.4 kg | 80% |
| 5 mm | 9 | 860 | 5.1 kg | 100% |
| 5 mm | 1 | 720 | 3.1 kg | 30% |
| 2 mm | 1 | 570 | 2.7 kg | 50% |

Results using the material of Example 2 at a density of 400 g/liter on a carpet of overall thickness of 6 mm

| 2 mm | 9 | 480 | 3.2 kg | 70% |
|---|---|---|---|---|
| 5 mm | 9 | 560 | 3.5 kg | 100% |
| 5 mm | 1 | 500 | 2.7 kg | 40% |
| 2 mm | 1 | 450 | 2.6 kg | 60% |

For each of the foregoing Examples the resulting pre-coated carpeting was provided with a foam backing in the manner referred to above. By way of example, a suitable latex mixture for use in forming the foam backing would as follows.

A foam-forming mixture is formed by mixing the following main ingredients (in parts by dry weight):

| Styrene-butadiene rubber latex (Intex 131) | 100.00 |
|---|---|
| Sodium hexametaphosphate (sequestering agent) | 1.00 |
| Disodium alkyl sulphosuccinamate (soap) (Empimin MKK) | 4.00 |
| Sulphur (curing agent) | 2.00 |
| Zinc diethyldithiocarbamate (curing accelerator) | 0.75 |
| Mercaptobenzthiazole (curing accelerator) | 0.25 |
| Antioxidant | 0.50 |
| Zinc oxide (curing activator) | 1.00 |
| Water | 20.00 |
| Hydroxy propyl methyl cellulose | 1.25 |

-continued

| (Methocell 228) | |
|---|---|
| Potassium hydroxide | 0.20 |
| Sodium lauryl sulphate | 0.50 |
| Limestone (Calmote) 200 mesh (BS) | 200.00 |

Total solids content 77.75%
Viscosity 4000–5000 cps
pH 10.5 to 11.5 pH 10.5 to 11.5 Viscosity 4000–5000 cps

The resulting mixture is a stable dispersion which is viscous but readily pourable. The mixture is mechanically foamed in conventional manner with compressed air.

The resulting mixture is a stable dispersion which is viscous but readily pourable. The mixture is mechanically foamed in conventional manner with compressed air.

With the Examples described above a pre-coat of desired thickness/ density can be reliably formed in a particularly convenient manner.

It is of course to be understood that the invention is not intended to be restricted to the above Examples.

Thus, whilst reference is made to the feed of pre-coat material to the outside of the perforated roller it is to be understood that other arrangements may be possible. For example the material may be fed to the substrate in advance of the roller or the material may be fed to the interior of the roller. In all cases, however, the effect of the perforated roller is to permit formation of a well of material through the perforation thereby to facilitate application under pressure of the required quantity of material to the substrate. The pre-coat material may be foamed or unfoamed as desired. The bottom roller 2 may be replaced by or used additionally to a non-movable support table or slide surface.

Further, whilst the invention as described above relates to the formation of a flexible laminate including a backing layer, if desired the pre-coat technique, and the pre-coat apparatus may be used to produce a finished product i.e. the method would be as described above with the omission of the backing layer and the apparatus would be as described above with the omission of the second station.

I claim:

1. A method of forming a flexible laminate by bonding a backing layer to a pre-coated textile substrate, said method comprising the steps of:
   moving the substrate with a guide arrangement relative to a rotatable transfer roller so that a back surface of the substrate is in contact with or in close proximity to the roller;
   feeding fluent settable coating material to the roller to be deposited therefrom onto the said back surface of the substrate;
   causing or allowing the deposited coating material to set so as to form a pre-coat on said back surface; and
   bonding a backing layer to said pre-coated back surface; characterised in that said transfer roller is a hollow perforated roller containing an internal doctor member; the fluent coating material is fed to the roller so as to form a well of the material between and freely in contact with the back surface and the doctor member through the perforated wall of the roller; and the spacing of the roller relative to the substrate and the pressure of the doctor member relative to the perforated wall of the roller are adjusted to give a desired thickness or density of the pre-coat.

2. A method according to claim 1, characterised in that the transfer roller is arranged above a support of said guide arrangement which supports said substrate, and the spacing of said roller and said support is adjustable to adjust the said spacing of the roller relative to the substrate.

3. A method according to claim 1, characterised in that the doctor member comprises a resiliently deflectable blade which is non-rotatably mounted within the transfer roller so as to make sliding contact with its inner surface, and the blade is movable in a direction towards and away from the inner surface of the roller to adjust the deflection of the blade and hence the said pressure of the doctor member relative to the perforated wall of the roller.

4. A method according to claim 1, characterised in that the textile substrate comprises carpeting material having cut or uncut loops pushed through a backing cloth.

5. A method according to claim 1, characterised in that the said coating material is a latex.

6. A method according to claim 5, characterised in that the latex is foamed and the foam collapses and is crushed on the back surface by the roller.

7. A method according to claim 1, characterised in that the said backing layer comprises a textile fabric.

8. A method according to claim 1, characterised in that the backing layer comprises a layer of polymeric material which is formed in situ by the steps of:
   moving the pre-coated substrate with a guide arrangement relative to a rotatable application roller so that the pre-coated back surface of the substrate is in contact with or in close proximity to the roller;
   feeding fluent settable polymeric material to the application roller to be deposited therefrom onto the said pre-coated back surface of the substrate; and
   causing or allowing the deposited polymeric material to set so as to form a polymeric backing layer on said pre-coated back surface.

9. A method according to claim 8, characterised in that the application roller is a hollow perforated roller containing an internal abutment; and the fluent polymeric material is fed to the roller so as to form a well of the material between and freely in contact with the back surface and the abutment through the perforated wall of the application roller.

10. Apparatus for use in forming a flexible laminate by bonding a backing layer to a pre-coated textile substrate, said apparatus having a first station comprising a transfer roller, a guide arrangement for moving the textile substrate in contact with or in close proximity to the roller, a feed arrangement for feeding fluent settable pre-coating material to the roller to be deposited therefrom onto the substrate, means for causing or allowing the deposited pre-coating material to set; and said apparatus further having a second station comprising means for bonding a backing layer to said pre-coated back surface; characterised in that said transfer roller is a hollow roller having a perforated outer wall containing an internal doctor member; said feed arrangement is operable to feed said pre-coating material to the outside of said perforated outer wall so as to form a well of such material between and freely in contact with the substrate and the doctor member through the perforated wall; means is provided for adjusting the spacing of roller relative to the substrate; and means is provided for adjusting the pressure of the doctor member against the inner surface of the perforated wall of the roller.

11. Apparatus according to claim 10, characterised in that the guide arrangement comprises a support roller, the transfer roller is arranged above to define an elongate nip with the support roller, said nip being bounded at the top thereof directly by the perforated wall of the transfer roller continuously along the length of the nip.

12. Apparatus according to claim 10, characterised in that the doctor member comprises a resiliently deflectable blade which is non-rotatably mounted within the transfer roller so as to make sliding contact with its inner surface, and the blade is movable in a direction towards and away from the inner surface of the roller to adjust the deflection of the blade and hence the said pressure of the doctor member relative to the perforated wall of the roller.

13. Apparatus according to claim 10, characterised in that said bonding means of said second station comprises an application roller, a guide arrangement for moving the pre-coated textile substrate in contact with or in close proximity to the application roller, a feed arrangement for feeding fluent settable polymeric material to the roller to be deposited therefrom onto the substrate; and wherein said application roller is a hollow roller having a perforated outer wall containing an internal abutment and said feed arrangement is operable to feed said polymeric material to the outside of said perforated outer wall so as to form a well of such material between and freely in contact with the substrate and the abutment through the perforated wall.

14. A method of forming a coated textile substrate, said method comprising the steps of:
 moving the substrate with a guide arrangement relative to a rotatable transfer roller so that a back surface of the substrate is in contact with or in close proximity to the roller;
 feeding fluent settable coating material to the roller to be deposited therefrom onto the said back surface of the substrate;
 causing or allowing the deposited coating material to set so as to form a coat on said back surface; characterised in that said transfer roller is a hollow perforated roller containing an internal doctor member; the fluent coating material is fed to the roller so as to form a well of the material between and freely in contact with the back surface and the doctor member through the perforated wall of the roller; and the spacing of the roller relative to the substrate and the pressure of the doctor member relative to the perforated wall of the roller are adjusted to give a desired thickness or density of the coat.

15. Apparatus for use in forming a coated textile substrate, said substrate having a station comprising a transfer roller, a guide arrangement for moving the textile substrate in contact with or in close proximity to the roller, a feed arrangement for feeding fluent settable coating material to the roller to be deposited therefrom onto the substrate, means for causing or allowing the deposited coating material to set; characterised in that said transfer roller is a hollow roller having a perforated outer wall containing an internal doctor member; said feed arrangement is operable to feed said coating material to the outside of said perforated outer wall so as to form a well of such material between and freely in contact with the substrate and the doctor member through the perforated wall; means is provided for adjusting the spacing of roller relative to the substrate; and means is provided for adjusting the pressure of the doctor member against the inner surface of the perforated wall of the roller.

* * * * *